(12) United States Patent
Long, II

(10) Patent No.: US 11,842,597 B2
(45) Date of Patent: Dec. 12, 2023

(54) MOBILE COFFEE KIOSK METHOD AND DEVICES

(71) Applicant: Bruce Alexander Long, II, Murrieta, CA (US)

(72) Inventor: Bruce Alexander Long, II, Murrieta, CA (US)

( * ) Notice: Subject to any disclaimer, the term of this patent is extended or adjusted under 35 U.S.C. 154(b) by 270 days.

(21) Appl. No.: 17/359,631

(22) Filed: Jun. 27, 2021

(65) Prior Publication Data

US 2022/0415114 A1    Dec. 29, 2022

(51) Int. Cl.
*G07F 13/06* (2006.01)
*G06Q 10/087* (2023.01)
*G06Q 50/12* (2012.01)
*G05B 19/042* (2006.01)
*G06Q 20/18* (2012.01)

(52) U.S. Cl.
CPC ......... *G07F 13/065* (2013.01); *G05B 19/042* (2013.01); *G06Q 10/087* (2013.01); *G06Q 20/18* (2013.01); *G06Q 50/12* (2013.01); *G05B 2219/2645* (2013.01)

(58) Field of Classification Search
CPC ............................... G06Q 20/18; B66C 21/00
USPC .................................................. 212/274, 312
See application file for complete search history.

(56) References Cited

U.S. PATENT DOCUMENTS

| | | | | |
|---|---|---|---|---|
| 4,710,819 A * | 12/1987 | Brown | .................. | F16M 13/00 348/157 |
| 7,364,050 B2 * | 4/2008 | Guard | .................. | B60P 3/0257 296/22 |
| 8,509,947 B2 * | 8/2013 | Jarisch | ................. | A47J 31/407 221/96 |
| 10,369,693 B1 * | 8/2019 | Levine | ................. | A01C 7/085 |
| 10,471,590 B1 * | 11/2019 | Vachon | ................. | B25J 9/1623 |
| 2013/0203036 A1 * | 8/2013 | Jabara | ..................... | H04W 4/80 434/350 |
| 2017/0124547 A1 * | 5/2017 | Natarajan | ............ | G06Q 20/202 |
| 2017/0174343 A1 * | 6/2017 | Erickson | ............ | A61B 5/02055 |
| 2017/0293983 A1 * | 10/2017 | Long | .................... | B67D 1/0019 |

\* cited by examiner

*Primary Examiner* — Timothy R Waggoner
(74) *Attorney, Agent, or Firm* — Edmond DeFrank

(57) ABSTRACT

The embodiments disclose a method including providing a mobile coffee kiosk for automated beverage preparation and serving for customer orders placed wirelessly and on digital touch screens, utilizing a mobile coffee kiosk network for receiving and processing customer orders made from a mobile coffee kiosk app, providing a Wi-Fi communication device and cellular communication device for receiving customer orders from the mobile coffee kiosk network, preparing customer orders automatically received from the mobile coffee kiosk network, verifying a customer ID with a customer order pick-up identification system before the ordered beverage is served to the customer, transmitting automatically a customer order pick-up to the mobile coffee kiosk network, tracking beverage ingredient inventory automatically for reporting ready status on beverage menu selections availability to the mobile coffee kiosk network, and providing an automated sensor system for detecting and reporting contamination presence in the beverage preparation and servings systems.

20 Claims, 12 Drawing Sheets

US 11,842,597 B2

MOBILE COFFEE KIOSK METHOD AND DEVICES

BACKGROUND

Persons desiring a beverage generally buy one at a store, restaurant or café at a fixed location in a building. The locations may not be convenient for the beverage seeker but they have no alternative except a vending machine that again is at a fixed location. Hot beverages are even more difficult to acquire without waiting to place an order then wait additional time for the hot beverage to be prepared and served.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a mobile coffee kiosk method and devices is described for illustrative purposes and the underlying system can apply to any number and multiple types of vehicles. In one embodiment of the present invention, the mobile coffee kiosk method and devices can be configured using multiple delivery systems. The mobile coffee kiosk method and devices can be configured to include manual driving capability and can be configured to include autonomous driving capability using the present invention.

Figure 1:
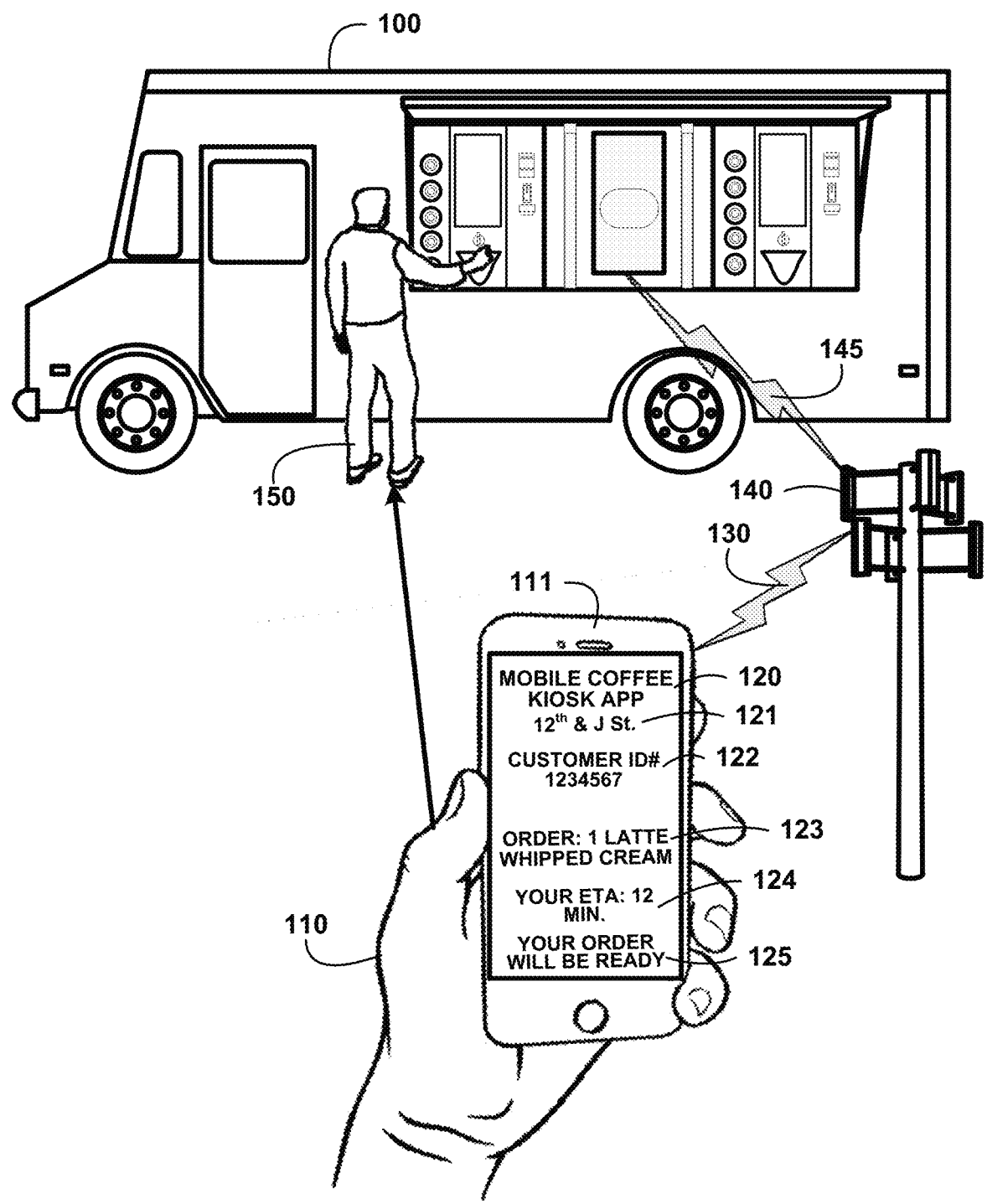
FIG. 1 shows for illustrative purposes only an example of an overview of a mobile coffee kiosk of one embodiment.

FIG. 1 shows for illustrative purposes only an example of an overview of a mobile coffee kiosk of one embodiment. FIG. 1 shows a mobile coffee kiosk 100. A user ordering on a digital device 110 may be a few blocks away on foot, may be a few miles away driving, and may be seated at their office a few blocks away. A user digital device 111 with a mobile coffee kiosk app 120 finds the closest mobile coffee kiosk location 121 displayed on their digital device automatically.

The mobile coffee kiosk app 120 uses the user digital device 111 GPS location to automatically query the mobile coffee kiosk location 121 database to locate the closest location to the user. The mobile coffee kiosk app 120 transmits the customer id #1234567 122 to a mobile coffee kiosk network to access the user's frequent and user entered favorite beverages. The user for example if driving can verbally speak their order as one of their favorites, one from the mobile coffee kiosk menu, or place a custom order from the mobile coffee kiosk menu ingredient listing. In this example the user places an order: 1 latte whipped cream 123.

The mobile coffee kiosk app 120 is capable of responding with audible verbal replies for example asking the user for your eta: 12 min. 124 with the user responding verbally. The mobile coffee kiosk app 120 responds your order will be ready 125. The mobile coffee kiosk network confirms the user's payment information on record and the user digital device transmitting order 130 is authorized for relay on a cell tower 140 to the closest mobile coffee kiosk location 121. The user arrives at mobile coffee kiosk to pick up order 150 of one embodiment.

DETAILED DESCRIPTION

Figure 2:
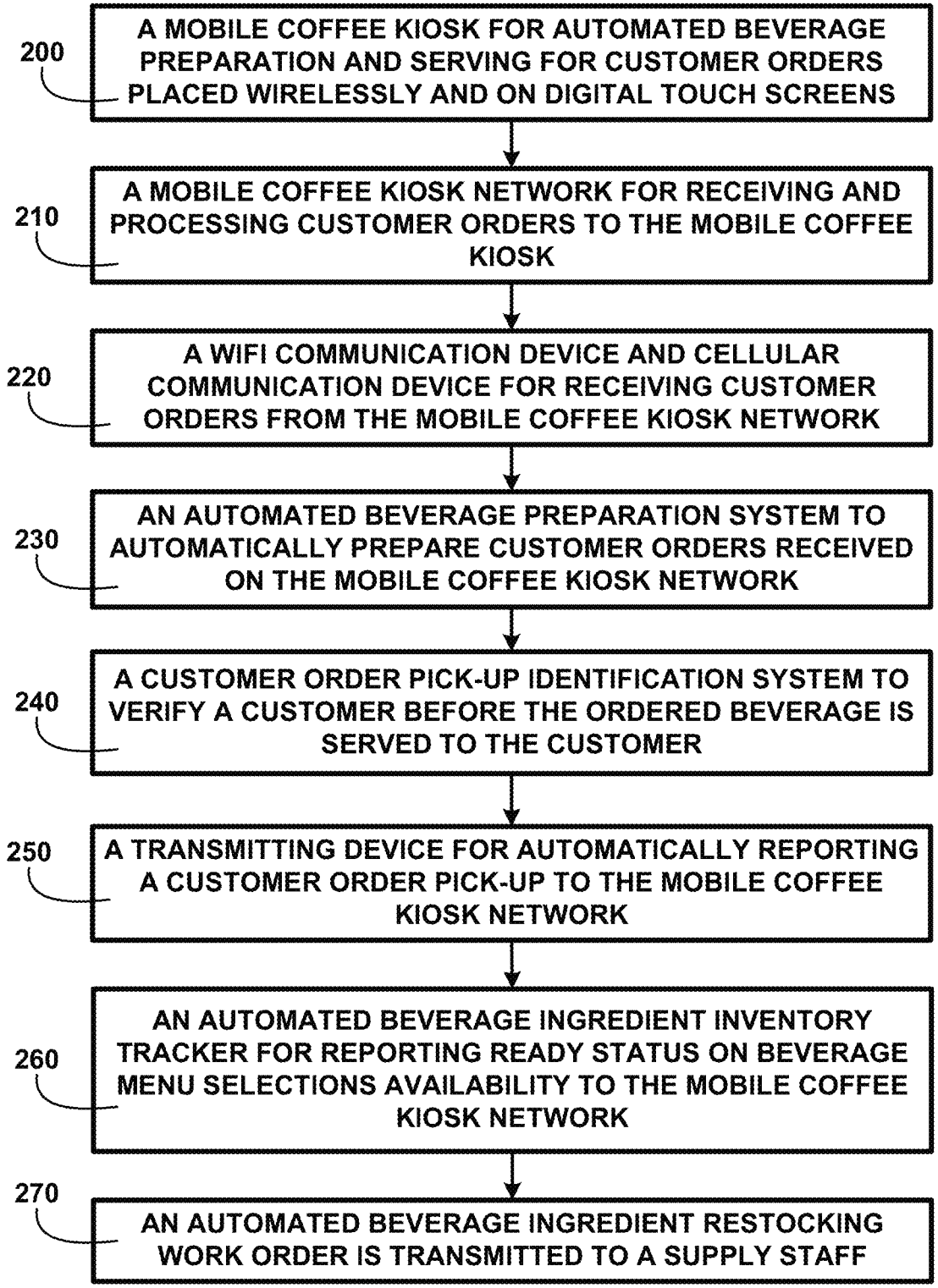
FIG. 2 shows a block diagram of an overview of a mobile coffee kiosk for automated beverage preparation and serving of one embodiment.

FIG. 2 shows a block diagram of an overview of a mobile coffee kiosk for automated beverage preparation and serving of one embodiment. FIG. 2 shows a mobile coffee kiosk for automated beverage preparation and serving for customer orders placed wirelessly and on digital touch screens 200. Providing a mobile coffee kiosk network for receiving and processing customer orders to the mobile coffee kiosk 210.

Each mobile coffee kiosk 100 includes a Wi-Fi communication device and cellular communication device for receiving customer orders from the mobile coffee kiosk network 220. Each mobile coffee kiosk 100 includes an automated beverage preparation system to automatically prepare customer orders received on the mobile coffee kiosk network 230. Each mobile coffee kiosk 100 includes a customer order pick-up identification system to verify a customer before the ordered beverage is served to the customer 240.

Each mobile coffee kiosk 100 includes a transmitting device for automatically reporting a customer order pick-up to the mobile coffee kiosk network 250 to complete the customer payment process. Each mobile coffee kiosk 100 includes an automated beverage ingredient inventory tracker for reporting ready status on beverage menu selections availability to the mobile coffee kiosk network 260. An automated beverage ingredient restocking work order is transmitted to a supply staff 270 of one embodiment.

Figure 3:
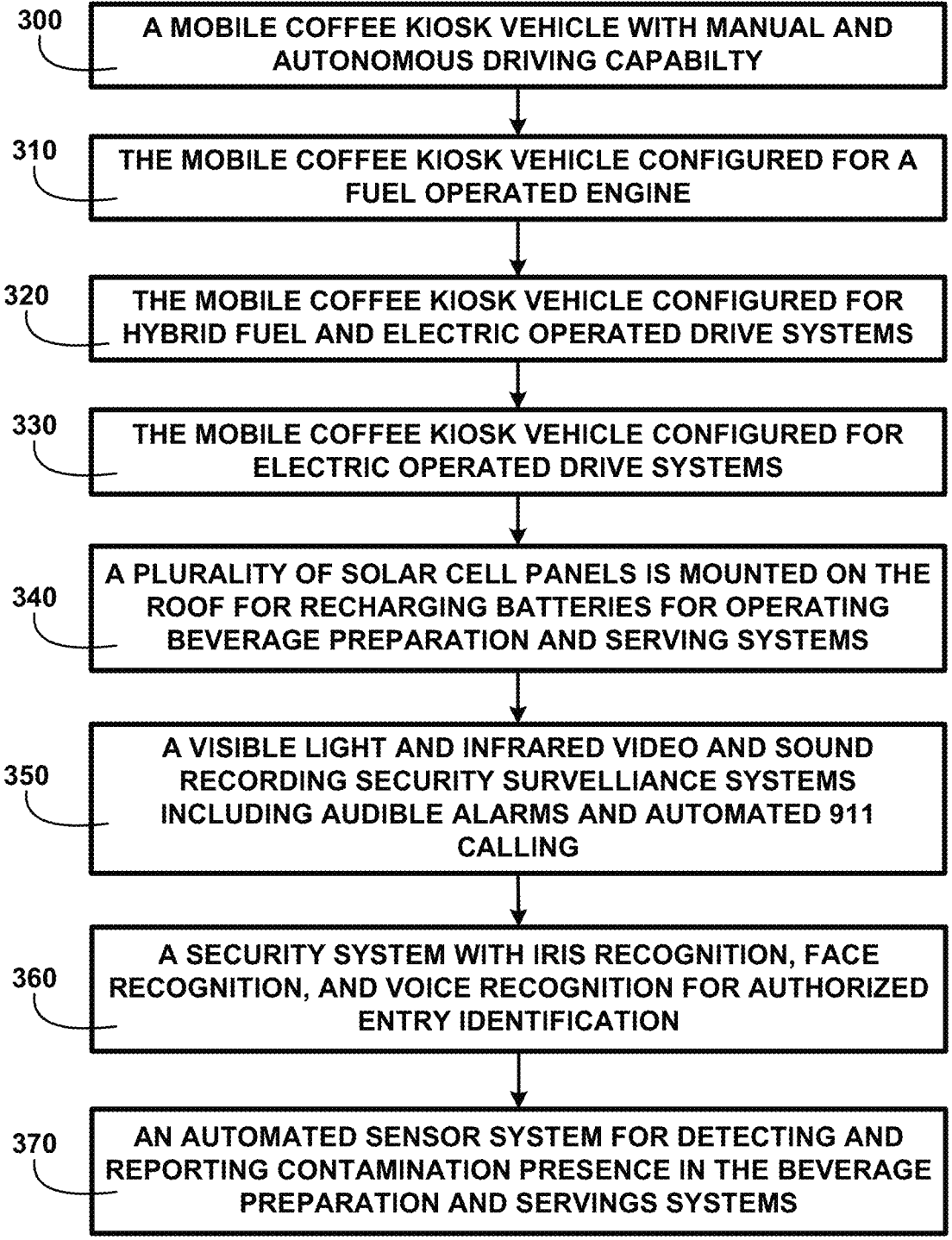
FIG. 3 shows a block diagram of an overview of a mobile coffee kiosk vehicle with autonomous driving capability of one embodiment.

A Mobile Coffee Kiosk Vehicle with Autonomous Driving Capability:

FIG. 3 shows a block diagram of an overview of a mobile coffee kiosk vehicle with autonomous driving capability of one embodiment. FIG. 3 shows a mobile coffee kiosk vehicle with manual and autonomous driving capability 300. The mobile coffee kiosk vehicle configured for a fuel operated engine 310. In another embodiment the mobile coffee kiosk vehicle configured for hybrid fuel and electric operated drive systems 320. In yet another embodiment the mobile coffee kiosk vehicle configured for electric operated drive systems 330.

A plurality of solar cell panels is mounted on the roof for recharging batteries for operating beverage preparation and serving systems 340. Each mobile coffee kiosk 100 includes a visible light and infrared video and sound recording security surveillance systems including audible alarms and automated 911 calling 350. Each mobile coffee kiosk 100 includes a security system with iris recognition, face recognition, and voice recognition for authorized entry identification 360. Each mobile coffee kiosk 100 includes an automated sensor system for detecting and reporting contamination presence in the beverage preparation and servings systems 370 of one embodiment.

Figure 4:
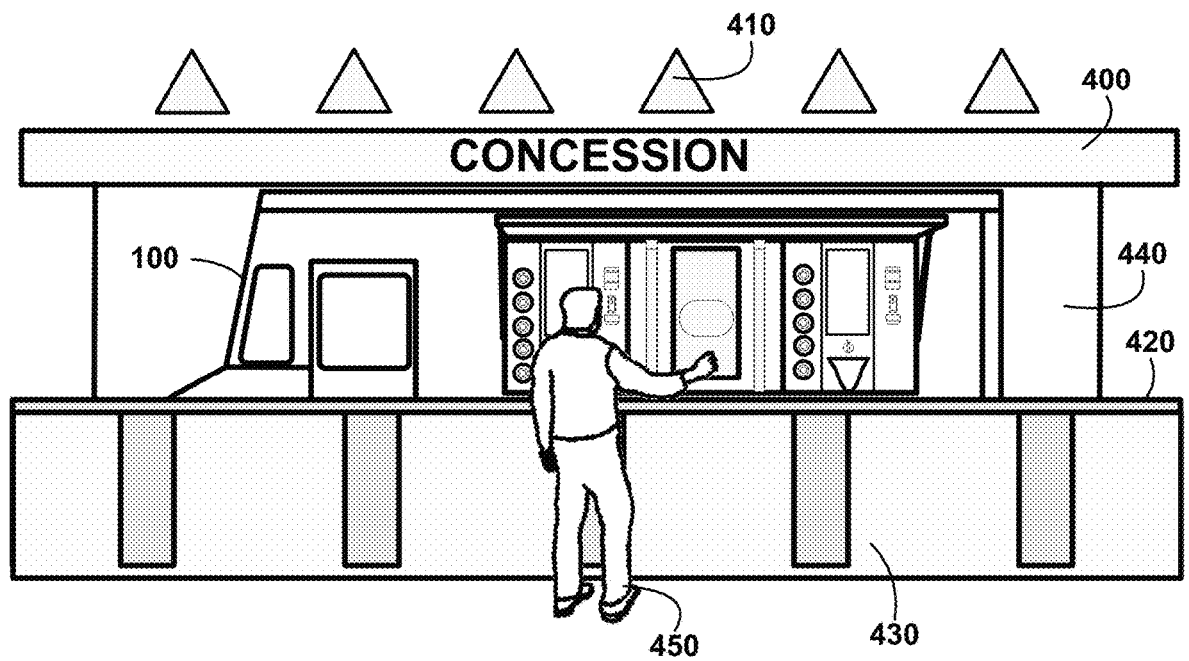
FIG. 4 shows for illustrative purposes only an example of a mobile coffee kiosk in a stationary concession mode of one embodiment.

A Mobile Coffee Kiosk in a Stationary Concession Mode:

FIG. 4 shows for illustrative purposes only an example of a mobile coffee kiosk in a stationary concession mode of one embodiment. FIG. 4 shows the mobile coffee kiosk 100 parked in a concession space 440. Above the concession space 440 is a concession marquee 400 and exterior area lighting 410. After parking the mobile coffee kiosk 100 parked in a concession space 440 a supply staff erects a removable countertop 420 and a removable serving wall 430. When the concession set-up is complete a user making a touch screen order 450 may easily approach the mobile coffee kiosk 100 parked in a concession space 440 for making order and picking up order transmitted using the mobile coffee kiosk app 120 of FIG. 1 of one embodiment.

Figure 5:
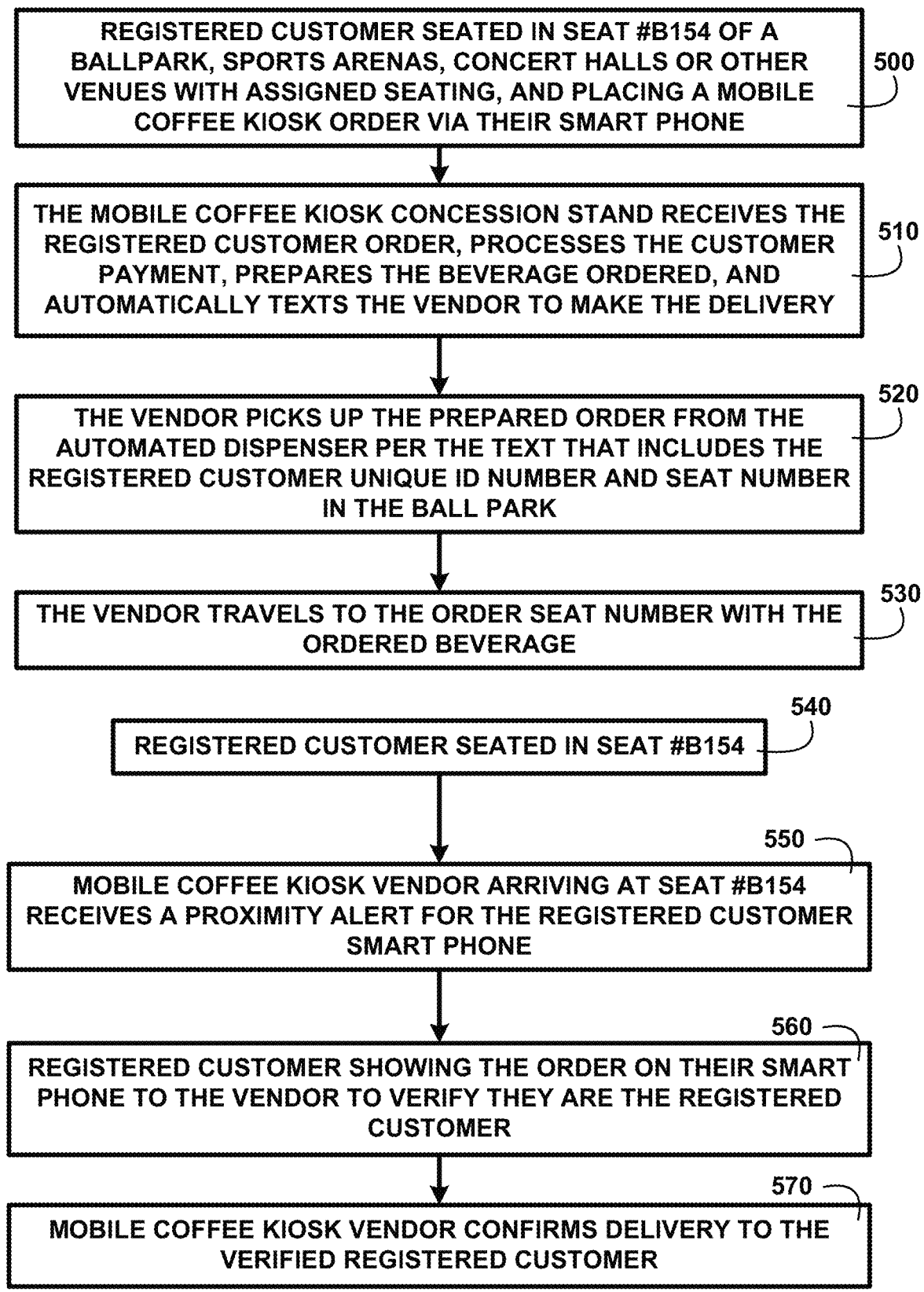
FIG. 5 shows a block diagram of an overview of a registered customer seated in a ballpark placing a mobile coffee kiosk order of one embodiment.

A Registered Customer Seated in a Ballpark Placing a Mobile Coffee Kiosk Order:

FIG. 5 shows a block diagram of an overview of a registered customer seated in a ballpark placing a mobile coffee kiosk order of one embodiment. FIG. 5 shows a registered customer seated in seat #B154 of a ballpark, sports arenas, concert halls or other venues with assigned seating, and placing a mobile coffee kiosk order via their smart phone 500. The mobile coffee kiosk concession stand receives the registered customer order, processes the customer payment, prepares the beverage ordered, and automatically texts the vendor to make the delivery 510 automatically.

The vendor picks up the prepared order from the automated dispenser per the text that includes the registered customer unique ID number and seat number in the ball park 520. The vendor travels to the order seat number with the ordered beverage 530 for the registered customer seated in seat #B154 540. The mobile coffee kiosk vendor arriving at seat #B154 receives a proximity alert for the registered customer smart phone 550. The registered customer showing the order on their smart phone to the vendor to verify they are the registered customer 560. The mobile coffee kiosk vendor confirms delivery to the verified registered customer 570 of one embodiment.

Figure 6:
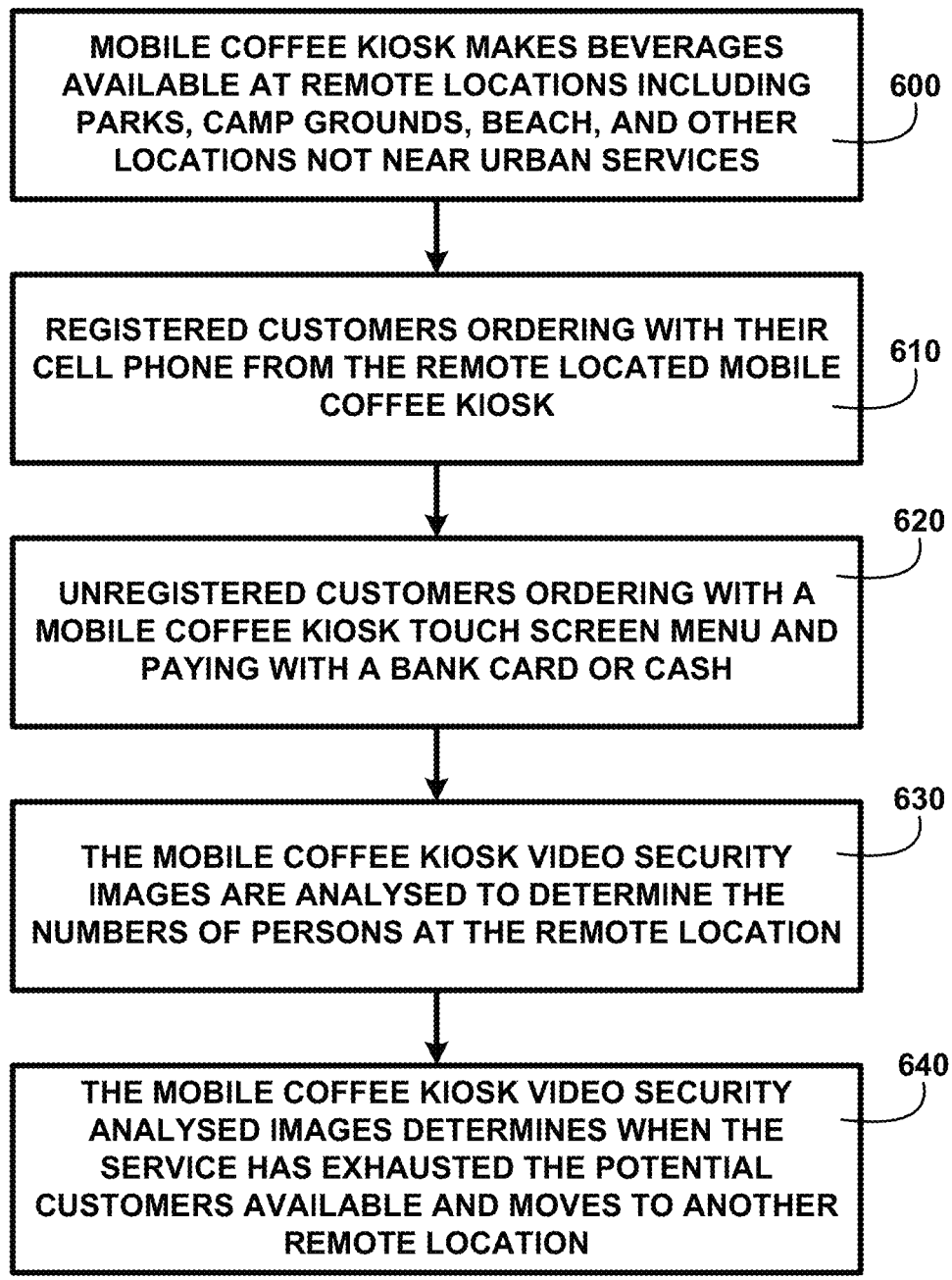
FIG. 6 shows a block diagram of an overview of mobile coffee kiosk makes beverages available at remote locations of one embodiment.

Mobile Coffee Kiosk Makes Beverages Available at Remote Locations:

FIG. 6 shows a block diagram of an overview of mobile coffee kiosk makes beverages available at remote locations of one embodiment. FIG. 6 shows the mobile coffee kiosk makes beverages available at remote locations including parks, camp grounds, beach, and other locations not near urban services 600. Registered customers ordering with their cell phone from the remote located mobile coffee kiosk 610.

Unregistered customers ordering with a mobile coffee kiosk touch screen menu and paying with a bank card or cash 620. The mobile coffee kiosk video security images are analyzed to determine the numbers of persons at the remote location 630. The mobile coffee kiosk video security analyzed images determines when the service has exhausted the potential customers available and moves to another remote location 640 of one embodiment.

Figure 7:
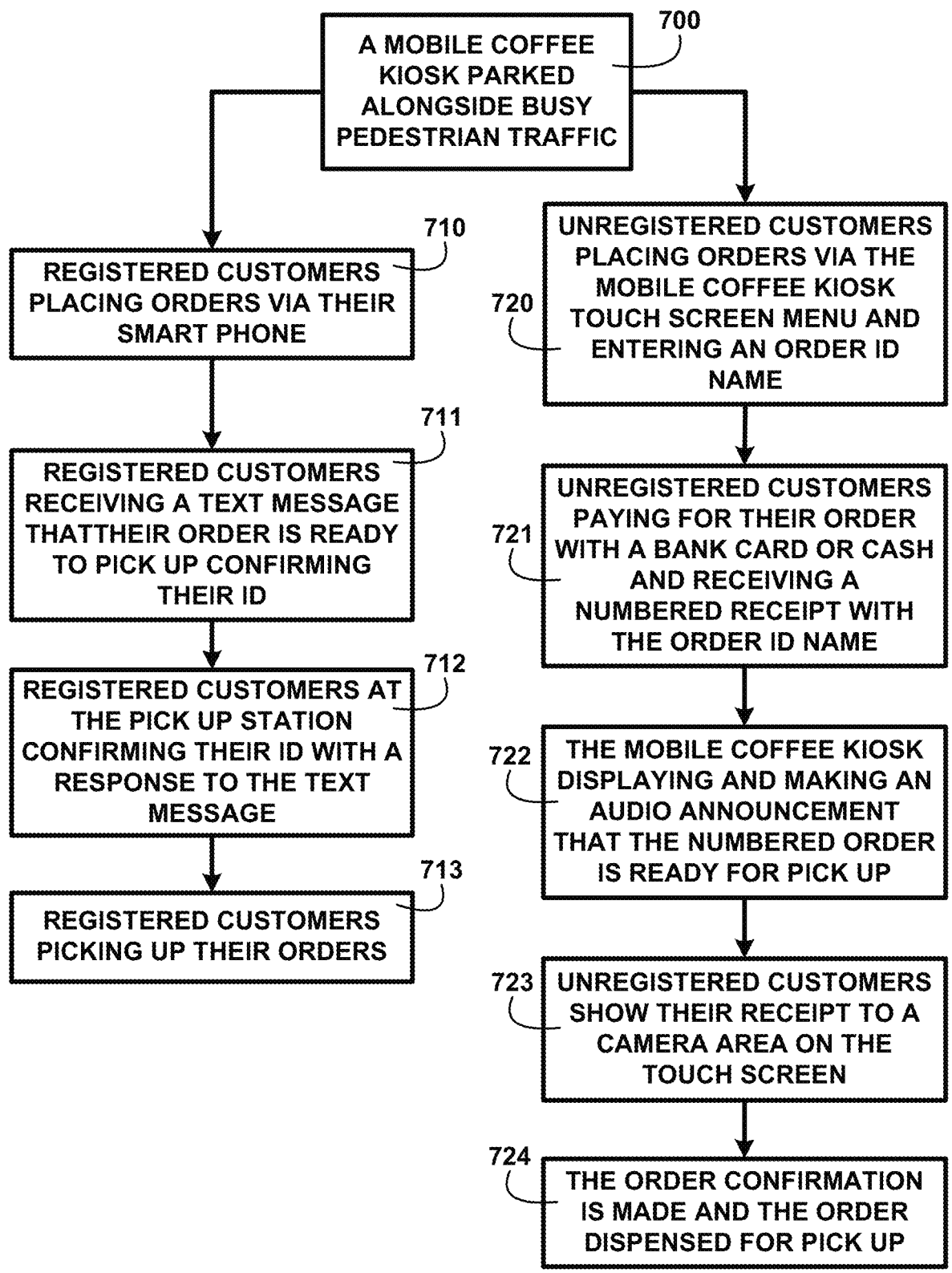
FIG. 7 shows a block diagram of an overview of a mobile coffee kiosk parked alongside busy pedestrian traffic of one embodiment.

A Mobile Coffee Kiosk Parked Alongside Busy Pedestrian Traffic:

FIG. 7 shows a block diagram of an overview of a mobile coffee kiosk parked alongside busy pedestrian traffic of one embodiment. FIG. 7 shows a mobile coffee kiosk parked alongside busy pedestrian traffic 700. Registered customers placing orders via their smart phone 710. Registered customers receiving a text message that their order is ready to pick-up confirming their ID 711. Registered customers at the pick-up station confirming their ID with a response to the text message 712. Registered customers picking up their orders 713.

Unregistered customers placing orders via the mobile coffee kiosk touch screen menu and entering an order ID name 720. Unregistered customers paying for their order with a bank card or cash and receiving a numbered receipt with the order ID name 721. The mobile coffee kiosk displaying and making an audio announcement that the numbered order is ready for pick up 722. The unregistered customers show their receipt to a camera area on the touch screen 723. The order confirmation is made and the order dispensed for pick-up 724 of one embodiment.

Figure 8:
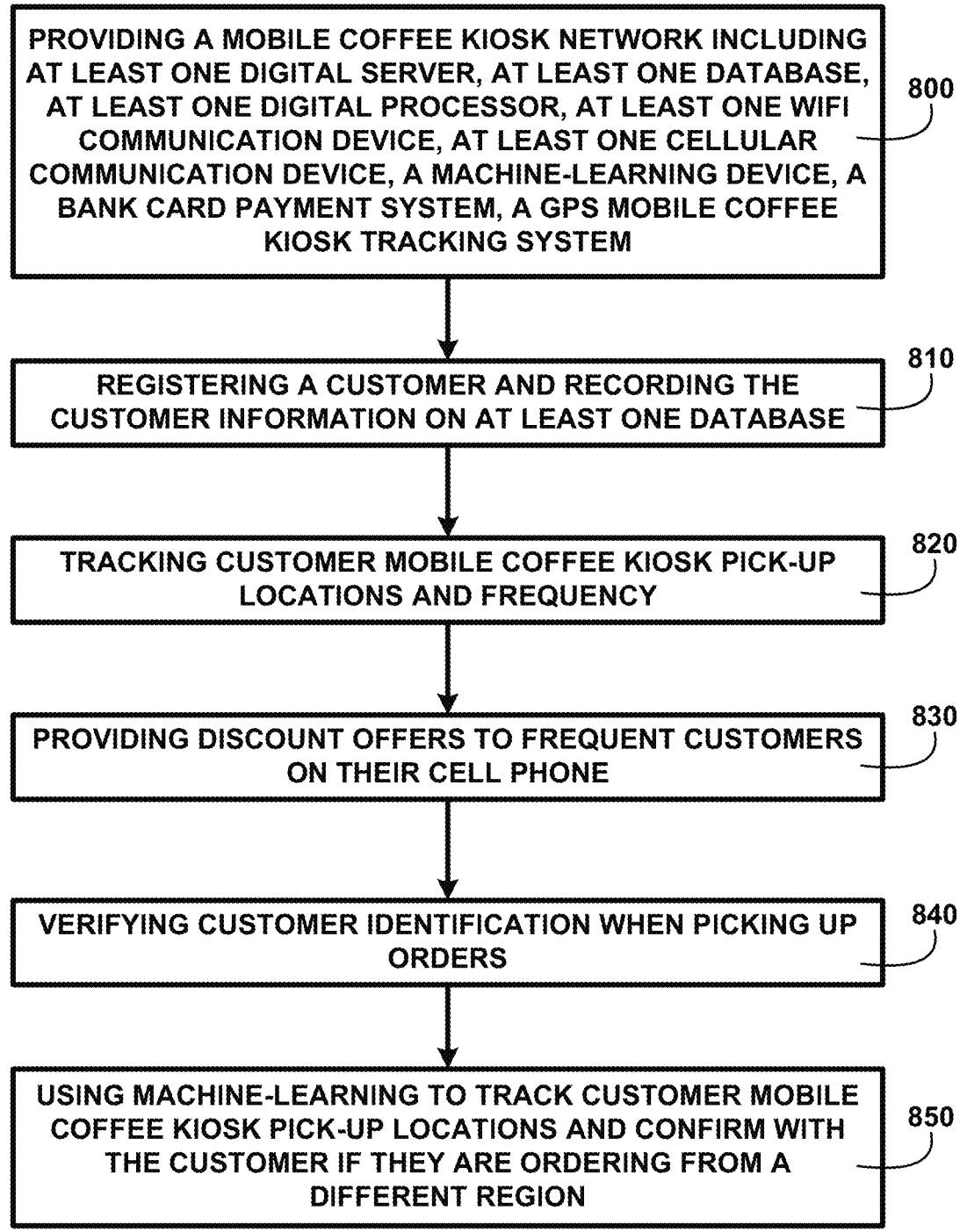
FIG. 8 shows a block diagram of an overview of a mobile coffee kiosk network of one embodiment.

A Mobile Coffee Kiosk Network:

FIG. 8 shows a block diagram of an overview of a mobile coffee kiosk network of one embodiment. FIG. 8 shows providing a mobile coffee kiosk network including at least one digital server, at least one database, at least one digital processor, at least one Wi-Fi communication device, at least one cellular communication device, a machine-learning device, a bank card payment system, a GPS mobile coffee kiosk tracking system 800.

The mobile coffee kiosk network in one embodiment is for registering a customer and recording the customer information on at least one database 810. The mobile coffee kiosk network in one embodiment is for tracking customer mobile coffee kiosk pick-up locations and frequency 820. The mobile coffee kiosk network in one embodiment is for providing discount offers to frequent customers on their cell phone 830. The mobile coffee kiosk network in one embodiment is for verifying customer identification when picking up orders 840. The mobile coffee kiosk network is configured for using machine-learning to track customer mobile coffee kiosk pick-up locations and confirm with the customer if they are ordering from a different region 850 of one embodiment.

Figure 9:
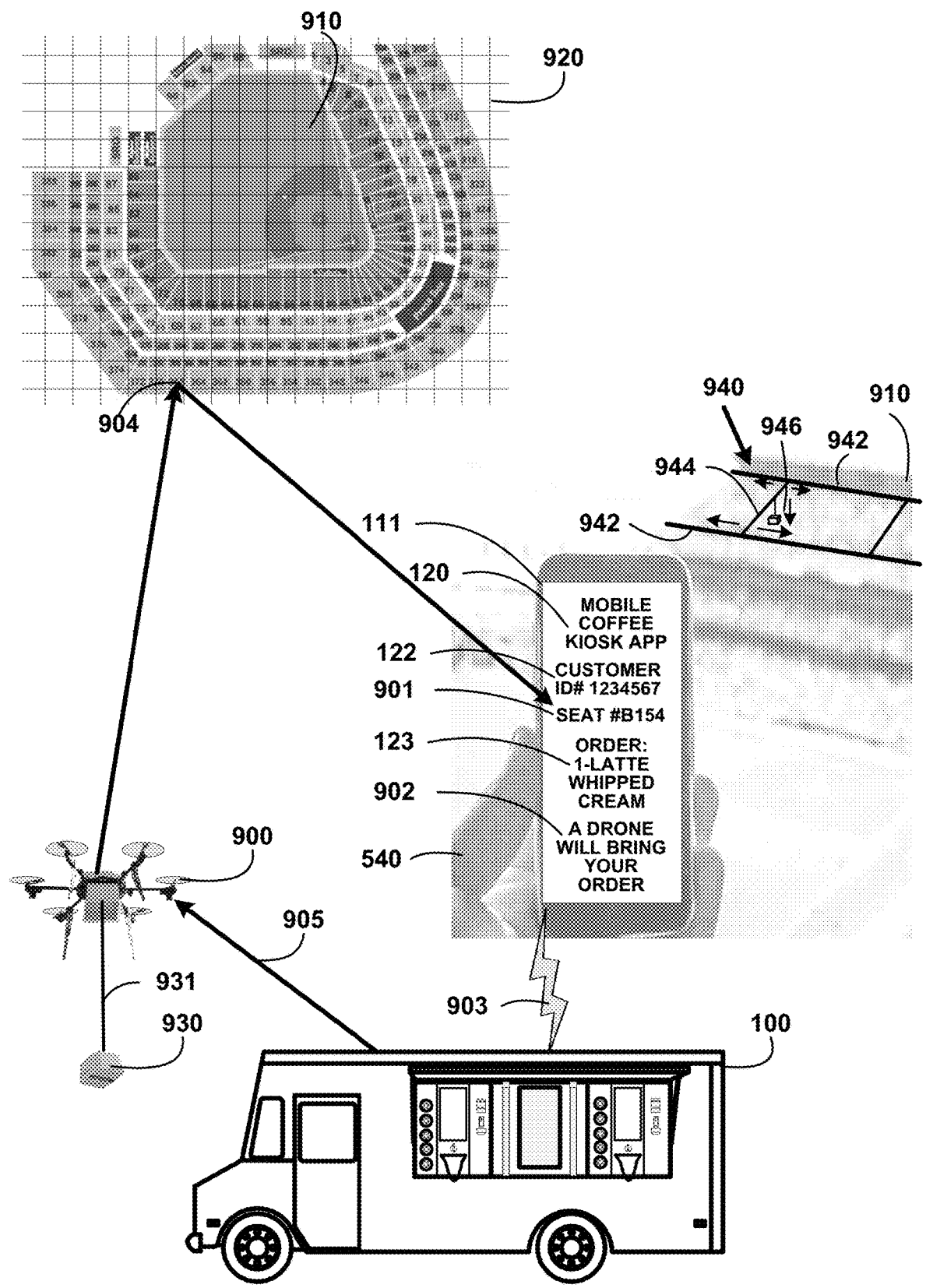
FIG. 9 shows for illustrative purposes only an example of a mobile coffee kiosk drone order delivery of one embodiment.

A Mobile Coffee Kiosk Drone Order Delivery:

FIG. 9 shows for illustrative purposes only an example of a mobile coffee kiosk drone order delivery of one embodiment. FIG. 9 shows a user digital device 111 with the mobile coffee kiosk app 120 installed. The mobile coffee kiosk app 120 displays the customer ID #1234567 122, user's seat #B154 901, the order: 1 latte whipped cream 123, and a message that a drone will bring your order 902. The order will be drone delivered to the registered customer seated in seat #B154 540.

The user's order from seat #B154 is transmitted 903 to the mobile coffee kiosk 100. The prepared order is conveyored into the drone delivery container 930 cable connected to a mobile coffee kiosk delivery drone 900. Upon placement of the prepared orders into the drone delivery container 930 a drone control system will proceed to a mobile coffee kiosk delivery drone launch 905.

The launched delivery drone flies a predetermined flight path into the baseball park 910 to ball park seat #B154 904. The predetermined flight path is processed by the mobile coffee kiosk network using the seat numbers of the drone deliver container orders using a baseball park GPS grid 920. The flight path includes altitudes of the drone to minimize rotor turbulence over seated fans and to maintain a safe distance from persons and the rotor blades. An extendable/retractable cable 931 is used to lower the order to the ball park seat #B154 904 GPS locations. A camera coupled to the drone delivery container captures an image of the order placed on the user's digital device to verify the customer for pick-up of one embodiment. In another embodiment a X-Y-Z cable delivery system is provided for delivering mobile coffee kiosk app orders as shown in FIG. 9 and described in FIG. 12. FIG. 9 shows the X-Y-Z cable delivery system 940 installed above the seats. The X-Y-Z cable delivery system 940 includes a pair of stationary X cables 942, movable Y cables 944 are coupled to the X cables 942 and move along to X cables, a Z cable 946 to lower the container to a user of one embodiment.

Figure 10:
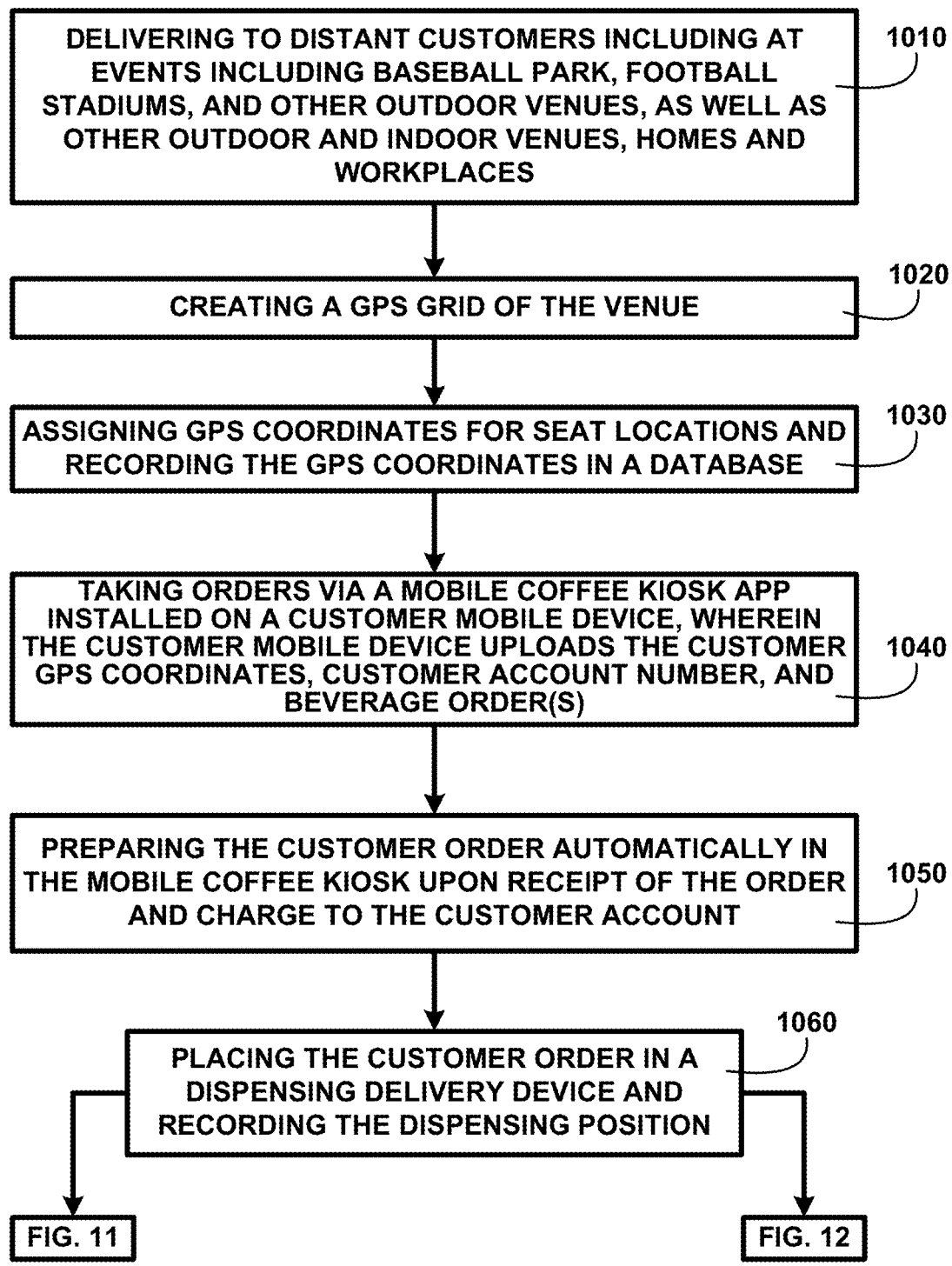
FIG. 10 shows a block diagram of an overview of mobile coffee kiosk app drone delivery of one embodiment.

Mobile Coffee Kiosk App Drone Delivery:

FIG. 10 shows a block diagram of an overview of mobile coffee kiosk app drone delivery of one embodiment. FIG. 10 shows providing mobile coffee kiosk app drone delivery 1000 for delivering to distant customers including at events including baseball park, football stadiums, and other outdoor venues, as well as other outdoor and indoor venues, homes and workplaces 1010. The mobile coffee kiosk network is used for creating a GPS grid of the venue 1020. The mobile coffee kiosk network processes the venue layout for assigning GPS coordinates for seat locations and recording the GPS coordinates in a database 1030. In another embodiment a X-Y-Z cable delivery system is provided for delivering mobile coffee kiosk app orders as described in FIG. 12.

The mobile coffee kiosk 100 is taking orders via a mobile coffee kiosk app installed on a customer mobile device, wherein the customer mobile device uploads the customer GPS coordinates, customer account number, and beverage order(s) 1040. The mobile coffee kiosk 100 is preparing the customer order(s) automatically in the mobile coffee kiosk upon receipt of the order and charge to the customer account 1050. The mobile coffee kiosk 100 is placing the customer order in a dispensing delivery device and recording the dispensing position 1060. Upon placing the orders in the dispensing delivery device the mobile coffee kiosk 100 proceeds with launching the delivery drone coupled to the dispensing delivery device with an extendable cable 1070 of one embodiment. The descriptions continue in FIG. 11.

Figure 11:
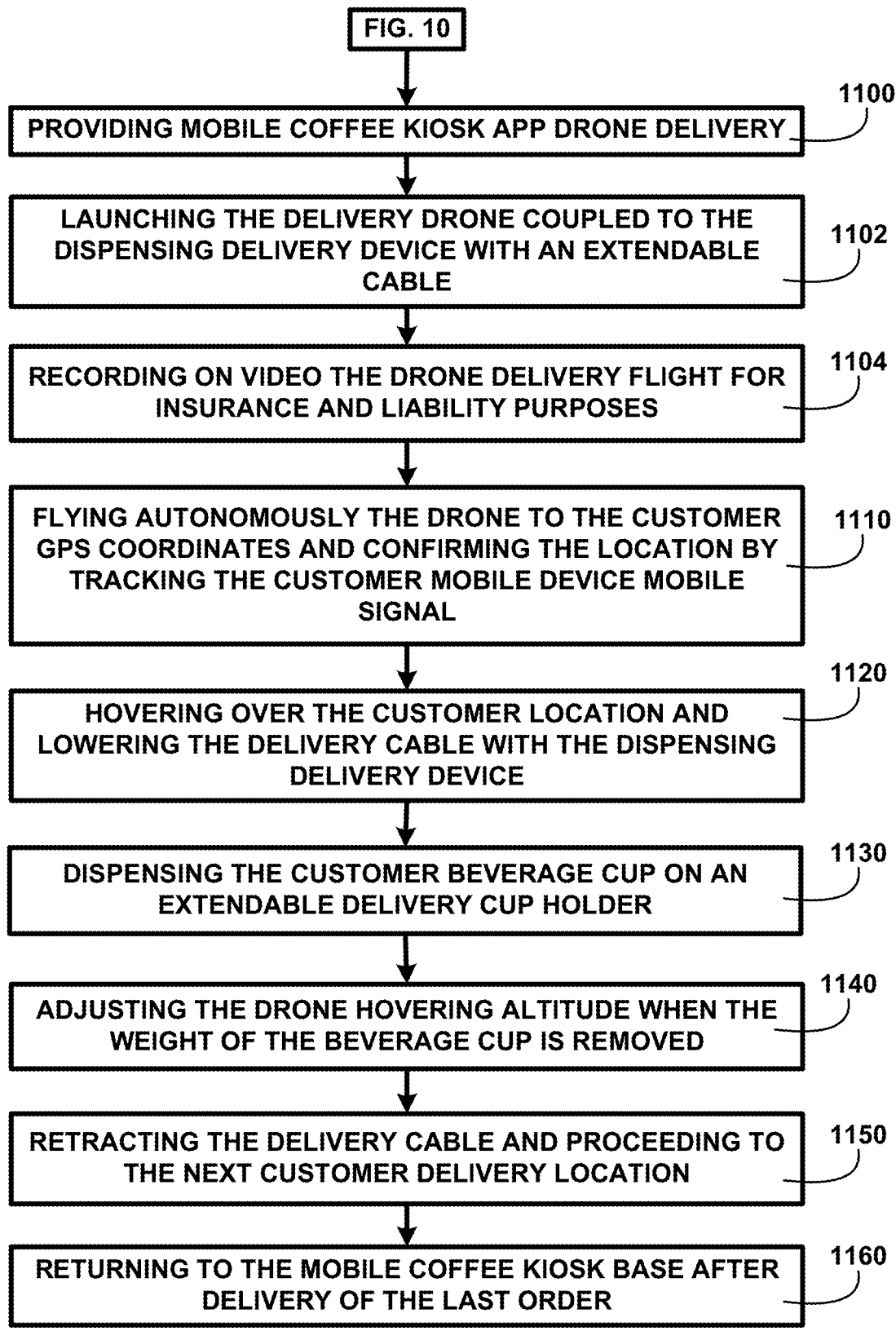
FIG. 11 shows a block diagram of an overview of recording on video the drone delivery flight of one embodiment.

Recording on Video the Drone Delivery Flight:

FIG. 11 shows a block diagram of an overview of recording on video the drone delivery flight of one embodiment. FIG. 11 shows a continuation from FIG. 10 providing mobile coffee kiosk app drone delivery 1100. Upon placing the orders in the dispensing delivery device the mobile coffee kiosk 100 proceeds with launching the delivery drone coupled to the dispensing delivery device with an extendable cable 1102. The recording on video the drone delivery flight is for insurance and liability purposes 1104. Flying autonomously the drone to the customer GPS coordinates and confirming the location by tracking the customer mobile device mobile signal 1110.

Hovering over the customer location and lowering the delivery cable with the dispensing delivery device 1120. Dispensing the customer beverage cup on an extendable delivery cup holder 1130. While making the delivery the autonomously flown drone is adjusting the drone hovering altitude when the weight of the beverage cup is removed 1140, retracting the delivery cable and proceeding to the next customer delivery location 1150. The drone continues its flight for returning to the mobile coffee kiosk base after delivery of the last order 1160 of one embodiment.

Figure 12:
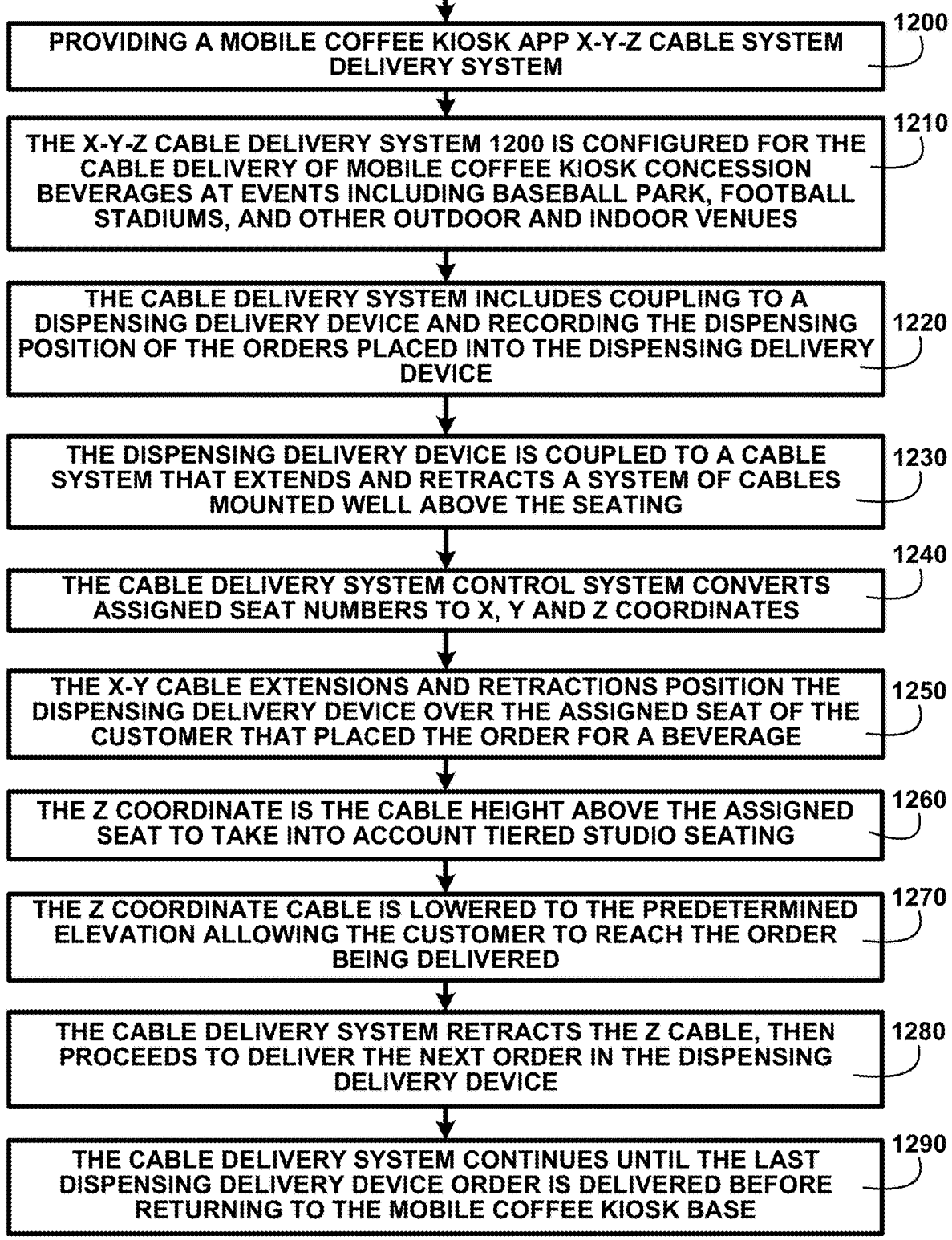
FIG. 12 shows a block diagram of an overview of a X-Y-Z cable delivery system of one embodiment.

X-Y-Z Cable System Delivery System:

FIG. 12 shows a block diagram of an overview of a X-Y-Z cable delivery system of one embodiment. FIG. 12 shows a continuation from FIG. 10 providing a mobile coffee kiosk app X-Y-Z cable delivery system 1200. The X-Y-Z cable delivery system 1200 is configured for the cable delivery of mobile coffee kiosk concession beverages at events including baseball park, football stadiums, and other outdoor and indoor venues 1210. The cable delivery system includes coupling to a dispensing delivery device and recording the dispensing position of the orders placed into the dispensing delivery device 1220. In this instance the dispensing delivery device is coupled to a cable system that extends and retracts a system of cables mounted well above the seating 1230. The cable delivery system control system converts assigned seat numbers to X, Y and Z coordinates 1240.

The X-Y cable extensions and retractions position the dispensing delivery device over the assigned seat of the customer that placed the order for a beverage 1250. The Z coordinate is the cable height above the assigned seat to take into account tiered studio seating 1260. The Z coordinate cable is lowered to the predetermined elevation allowing the customer to reach the order being delivered 1270. The cable delivery system retracts the Z cable, then proceeds to deliver the next order in the dispensing delivery device 1280. The cable delivery system continues until the last dispensing delivery device order is delivered before returning to the mobile coffee kiosk base 1290 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
providing a mobile coffee kiosk for automated beverage preparation and serving for customer orders placed wirelessly and on digital touch screens;
utilizing a mobile coffee kiosk network for receiving and processing customer orders made from a mobile coffee kiosk app;
providing a Wi-Fi communication device and cellular communication device for receiving customer orders from the mobile coffee kiosk network;
preparing customer orders automatically received from the mobile coffee kiosk network;
providing a X-Y-Z cable delivery system for delivery of mobile coffee kiosk concession beverages at events venues;
verifying a customer ID with a customer order pick-up identification system before the ordered beverage is served to the customer;

transmitting automatically a customer order pick-up to the mobile coffee kiosk network;

tracking beverage ingredient inventory automatically for reporting ready status on beverage menu selections availability to the mobile coffee kiosk network; and providing an automated sensor system for detecting and reporting contamination presence in the beverage preparation and servings systems.

2. The method of claim 1, further comprising providing a mobile coffee kiosk vehicle with manual and autonomous driving capability.

3. The method of claim 1, further comprising providing the mobile coffee kiosk vehicle configured for a fuel operated engine.

4. The method of claim 1, further comprising providing the mobile coffee kiosk vehicle configured for hybrid fuel and electric operated drive systems.

5. The method of claim 1, further comprising providing the mobile coffee kiosk vehicle configured for electric operated drive systems.

6. The method of claim 1, further comprising providing a plurality of solar cell panels mounted on the roof for recharging batteries for operating beverage preparation and serving systems.

7. The method of claim 1, further comprising providing a visible light and infrared video and sound recording security surveillance systems including audible alarms and automated 911 calling.

8. The method of claim 1, further comprising providing a security system with iris recognition, face recognition, and voice recognition for authorized entry identification.

9. The method of claim 1, further comprising providing an automated beverage ingredient restocking work order transmitted to a supply staff.

10. The method of claim 1, further comprising providing a mobile coffee kiosk drone order delivery system.

11. An apparatus, comprising:
a mobile coffee kiosk for automated beverage preparation and serving for customer orders placed wirelessly and on digital touch screens;
a mobile coffee kiosk network for receiving and processing customer orders made from a mobile coffee kiosk app and transmitting the same to the mobile coffee kiosk;
a mobile coffee kiosk app for customers placing orders to the mobile coffee kiosk;
an automated beverage preparation and serving system for filling customer orders placed wirelessly and on digital touch screens to the mobile coffee kiosk;
a X-Y-Z cable delivery system for delivery of mobile coffee kiosk concession beverages at events venues;
an identification system for verifying a customer ID with a customer order pick-up before the ordered beverage is served to the customer from the mobile coffee kiosk; and
an automated sensor system for detecting and reporting contamination presence in the beverage preparation and servings systems.

12. The apparatus of claim 11, further comprising a security system with iris recognition, face recognition, and voice recognition for authorized entry identification to the mobile coffee kiosk.

13. The apparatus of claim 11, further comprising a visible light and infrared video and sound recording security surveillance systems including audible alarms and automated 911 calling.

14. The apparatus of claim 11, further comprising a mobile coffee kiosk drone order delivery system.

15. The apparatus of claim 11, further comprising a mobile coffee kiosk video security image analyzer for determining a number of potential customers available at a remote location.

16. An apparatus, comprising:
a mobile coffee kiosk app for customers placing orders to a mobile coffee kiosk;
a mobile coffee kiosk for automated beverage preparation and serving for customer orders placed wirelessly with the mobile coffee kiosk app;
a mobile coffee kiosk network for receiving and processing customer orders made from a mobile coffee kiosk app and transmitting the same to the mobile coffee kiosk;
a mobile coffee kiosk vehicle with manual and autonomous driving capability;
an automated beverage preparation and serving system for filling customer orders placed wirelessly with the mobile coffee kiosk app;
a X-Y-Z cable delivery system for delivery of mobile coffee kiosk concession beverages at events venues;
an identification system for verifying a customer ID with a customer order pick-up before the ordered beverage is served to the customer from the mobile coffee kiosk; and
an automated sensor system for detecting and reporting contamination presence in the beverage preparation and servings systems.

17. The apparatus of claim 16, further comprising a mobile coffee kiosk network for processing customer order payments, offering discounts to frequent ordering customers, and recording customer favorite and custom beverage selections.

18. The apparatus of claim 16, further comprising an automated beverage ingredient restocking work order transmitted to a supply staff.

19. The apparatus of claim 16, further comprising a mobile coffee kiosk drone order delivery system.

20. The apparatus of claim 16, further comprising the mobile coffee kiosk network for processing unregistered customers ordering with a mobile coffee kiosk touch screen menu and paying with a bank card or cash.

* * * * *